US009323032B2

(12) United States Patent
Amano

(10) Patent No.: US 9,323,032 B2
(45) Date of Patent: Apr. 26, 2016

(54) VARIABLE MAGNIFICATION PROJECTION OPTICAL SYSTEM AND PROJECTION DISPLAY APPARATUS

(71) Applicant: FUJIFILM Corporation, Tokyo (JP)

(72) Inventor: Masaru Amano, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 2 days.

(21) Appl. No.: 14/540,279

(22) Filed: Nov. 13, 2014

(65) Prior Publication Data

US 2015/0070778 A1    Mar. 12, 2015

Related U.S. Application Data

(63) Continuation of application No. PCT/JP2013/002916, filed on May 2, 2013.

(30) Foreign Application Priority Data

May 16, 2012  (JP) .................. 2012-112084

(51) Int. Cl.
G02B 13/22 (2006.01)
G02B 15/177 (2006.01)
G03B 21/14 (2006.01)
G02B 15/14 (2006.01)
G02B 13/18 (2006.01)

(52) U.S. Cl.
CPC ................ *G02B 13/22* (2013.01); *G02B 15/14* (2013.01); *G02B 15/177* (2013.01); *G03B 21/14* (2013.01); *G02B 13/18* (2013.01)

(58) Field of Classification Search
CPC ........ G02B 13/22; G02B 15/14; G02B 13/18; G02B 15/161; G03B 21/14
See application file for complete search history.

(56) References Cited

U.S. PATENT DOCUMENTS

| 5,600,488 | A | 2/1997 | Minefuji et al. |
| 5,645,334 | A | 7/1997 | Tejima et al. |
| 5,745,296 | A | 4/1998 | Nakamura et al. |
| 7,295,378 | B2 * | 11/2007 | Hakko ................. G02B 15/163 359/649 |

FOREIGN PATENT DOCUMENTS

| JP | 07-311338 | 11/1995 |
| JP | 08-106045 | 4/1996 |
| JP | 08-106065 | 4/1996 |
| JP | 08-313807 | 11/1996 |
| JP | 2005-345563 | 12/2005 |
| JP | 2010-113150 | 5/2010 |

OTHER PUBLICATIONS

International Search Report, PCT/JP2013/002916, Sep. 3, 2013.

* cited by examiner

Primary Examiner — Joseph P Martinez
(74) Attorney, Agent, or Firm — Young & Thompson

(57) ABSTRACT

A variable magnification projection optical system substantially consisting of two lens groups of a first lens group having a positive refractive power and is moved during magnification change, and a second lens group having a positive refractive power and is moved during magnification change, in which the variable magnification projection optical system is configured such that the reduction side is telecentric.

16 Claims, 10 Drawing Sheets

VARIABLE MAGNIFICATION PROJECTION OPTICAL SYSTEM AND PROJECTION DISPLAY APPARATUS

CROSS-REFERENCE TO RELATED APPLICATIONS

This application is a Continuation of PCT International Application No. PCT/JP2013/002916 filed on May 2, 2013, which claims priority under 35 U.S.C. §119 (a) to Japanese Patent Application No. 2012-112084 filed on May 16, 2012. Each of the above applications is hereby expressly incorporated by reference, in its entirety, into the present application.

BACKGROUND OF THE INVENTION

1. Technical Field

The present invention relates to a variable magnification projection optical system and a projection display apparatus, and more specifically to a two-group variable magnification projection optical system suitable for magnifying and projecting a light beam having image information from, for example, a light valve onto a screen, and a projection display apparatus equipped with the same.

2. Background Art

Recently, projection display devices that use light valves, such as liquid crystal display devices and DMD (Digital Micro-Mirror Device: registered trade mark) display devices have been widely used. In particular, those that use three light valves corresponding to each of the three primary colors of R (red), G (green), B (blue) to modulate each illumination light, then combine the light modulated by the respective light valves by, for example, a color combining prism, and display an image on a screen via a projection lens have been widely used.

As downsizing and high definition have advanced rapidly in such light valves, the demand for presentation using such projection display devices has also been increasing with a wide spread use of personal computers, and as those which are user-friendly and ease of installation are anticipated, the demand for a more compact and light weight projection display device having a higher performance with a higher magnification ratio is increasing. Further, along with this, a strong demand exists for more compact and light weight projection lenses having a higher performance with a higher magnification ratio. Further, at the same time, a strong demand for cost reduction in projection lenses also exists.

In the meantime, in a case where a color combining prism for combining modulated light from a plurality of light valves or a TIR (Total Internal Reflection) prism used for separating illumination light from projection light is disposed in an optical system, the reduction side of the projection lens is required to be telecentric in order to prevent generation of color unevenness in the former case and to prevent degradation in separation efficiency in the latter case.

As for the projection lenses used in such projection display devices, variable magnification optical systems capable of changing the size of a projected image on a screen are often used. Conventionally, telecentric variable magnification optical systems with four or five lens groups have often been used, and if a higher performance or a higher magnification is required, a variable magnification optical system with six lens groups has been used. But, such a multiple group configuration is undesirable for pursuing reduction in size, weight, and cost, since the configuration is complicated.

Consequently, Japanese Unexamined Patent Publication No. 2010-113150 proposes a zoom lens as a simply configured two group zoom lens. The zoom lens described in Japanese Unexamined Patent Publication No. 2010-113150 includes a first lens group having a negative refractive power and a second lens group having a positive refractive power disposed in order from the magnification side and is configured such that the two lens groups are moved in an optical axis direction during magnification change.

DISCLOSURE OF THE INVENTION

The projection lens described in aforementioned Japanese Unexamined Patent Publication No. 2010-113150, however, is not of a telecentric configuration on the reduction side and cannot be used in projection display devices that require, for example, a color combining prism or a TIR prism, although it has a two group simple and compact configuration.

Further, the configuration well known as two group zoom in which a negative first lens group and a positive second lens group are disposed in order from the magnification side, as in Japanese Unexamined Patent Publication No. 2010-113150, may secure a relatively a long back focus, but the second lens group which is a group involved in magnification change cannot be given a large magnification change effect if telecentricity is tried to be secured, so that the refractive power of the first lens group cannot be increased. Therefore, there is no choice but to increase the diameter of the first lens group and further the overall length of the lens system is increased, so that even a simplicity of configuration of two lens groups is achieved, such configuration is often unsuitable for reduction in size, weight, and cost.

In contrast, a two group configuration in which a positive first lens group and a negative second lens group are disposed in order from the magnification side cannot secure a sufficient a back focus to insert, for example, a color combining prism or a TIR prism. Further, for a configuration in which the most reduction side lens group has a negative refractive power, it is difficult to secure telecentricity.

The present invention has been developed in view of the circumstances described above, and it is an object of the present invention to provide a variable magnification projection optical system which is reduced in size, weight, and cost by employing a simple two group configuration and has a further satisfactory optical performance, while securing telecentricity on the reduction side. It is a further object of the present invention to provide a projection display apparatus equipped with such a variable magnification projection optical system.

A variable magnification projection optical system according to the present invention substantially consists of two lens groups of a first lens group having a positive refractive power and is moved during magnification change, and a second lens group having a positive refractive power and is moved during magnification change, disposed in order from the magnification side, in which the variable magnification projection optical system is configured such that the reduction side is telecentric.

The variable magnification projection optical system according to the present invention preferably satisfies a conditional expression (1) given below, and further preferably satisfies a conditional expression (1') given below.

$$1.0 < Bft/ft \qquad (1)$$

$$1.2 < Bft/fw \qquad (1')$$

where,

Bft: back focus of the entire system at the telephoto end (air equivalent distance)

fw: focal length of the entire system at the wide angle end

Preferably, the variable magnification projection optical system according to the present invention satisfies at least one of conditional expressions (2), (3), (2'), and (3') given below. A preferable embodiment may satisfy any one of the conditional expressions (2), (3), (2'), and (3') or any combination thereof.

$$1.5 < f1/fw < 3.5 \quad (2)$$

$$0.5 < f2/f1 < 1.5 \quad (3)$$

$$1.8 < f1/fw < 3.0 \quad (2')$$

$$0.8 < f2/f1 < 1.3 \quad (3')$$

where,
 f1: focal length of the first lens group
 f2: focal length of the second lens group
 fw: focal length of the entire system at the wide angle end Preferably, in the variable magnification projection optical system according to the present invention, the first lens group is substantially composed of five lenses.

Preferably, in the variable magnification projection optical system according to the present invention, the second and third lenses from the magnification side in the first lens group are a negative lens and a positive lens respectively.

Preferably, in the variable magnification projection optical system according to the present invention, the second lens group is substantially composed of three lenses or less.

Preferably, in the variable magnification projection optical system according to the present invention, the first and second lenses from the reduction side in the second lens group are a positive lens and a negative lens respectively.

Preferably, in the variable magnification projection optical system according to the present invention, the most magnification side lens in the first lens group is an aspherical lens. In that case, the most magnification side aspherical lens in the first lens group is preferably formed of a plastic material.

Preferably, in the variable magnification projection optical system according to the present invention, the most magnification side lens in the second lens group is an aspherical lens. In that case, the most magnification side aspherical lens in the second lens group is preferably formed of a plastic material.

A projection display apparatus according to the present invention includes a light source, a light valve that receives light from the light source, and the aforementioned variable magnification projection optical system of the present invention, as a variable magnification projection optical system for projecting an optical image formed by the light optically modulated by the light valve onto a screen.

The foregoing "magnification side" refers to the projected side (screen side) and the screen side is referred to as the magnification side even when reduced size projection is performed for convenience. In the meantime, the foregoing "reduction side" refers to the original image display area side (light valve side) and the light valve side is referred to as the reduction side even when reduced size projection is performed for convenience.

The foregoing "substantially consists of two lens groups" may include a lens with substantially no power, an optical element other than a lens, such as a stop, a cover glass, a filter, and the like, a lens flange, a lens barrel, and a mechanical component, such as a camera shake correction mechanism, and the like, other than the lens groups described as the constituent elements. The term "substantially" in the contexts of "substantially composed of five lenses" and "substantially composed of three-lenses or less" has the same meaning as that described above.

The foregoing "lens group" is not necessarily composed of a plurality of lenses and may include a lens group composed of only one lens.

The "back focus" is the distance on the optical axis between the most reduction side lens surface and the paraxial focal plane on the reduction side. Here, the magnification side and the reduction side are considered as the front side and back side respectively.

The surface shapes and the signs of refractive powers of the aforementioned lenses are considered in the paraxial region for those which include an aspherical surface.

The variable magnification projection optical system according to the present invention takes a simple two group configuration in which two groups are both positive lens groups and the reduction side is telecentric. This allows reduction in size, weight, and cost, and the telecentricity on the reduction side is maintained while securing aback focus that allows the insertion of a prism or the like although the overall length of the lens system is suppressed, thereby allowing maintenance of a satisfactory optical performance by reducing variations in aberrations during magnification change.

Further, the projection display apparatus according to the present invention is equipped with the variable magnification projection optical system. This allows a simple configuration, reduction in size, weight, and cost, and realization of a satisfactory projection performance.

Figure 6:
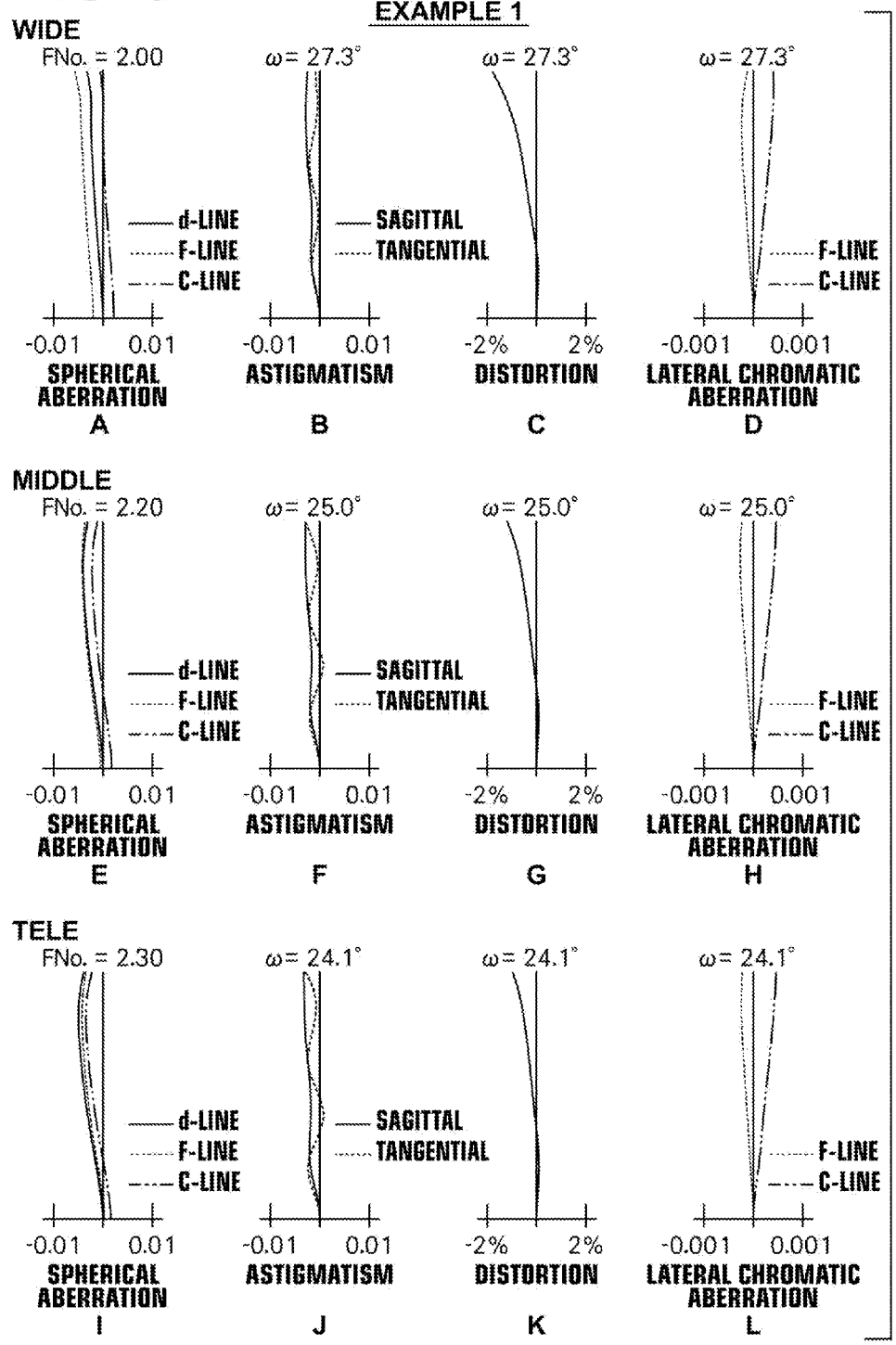

A to L of FIG. 6 illustrate each aberration diagram of the variable magnification projection optical system according to Example 1.

Figure 7:
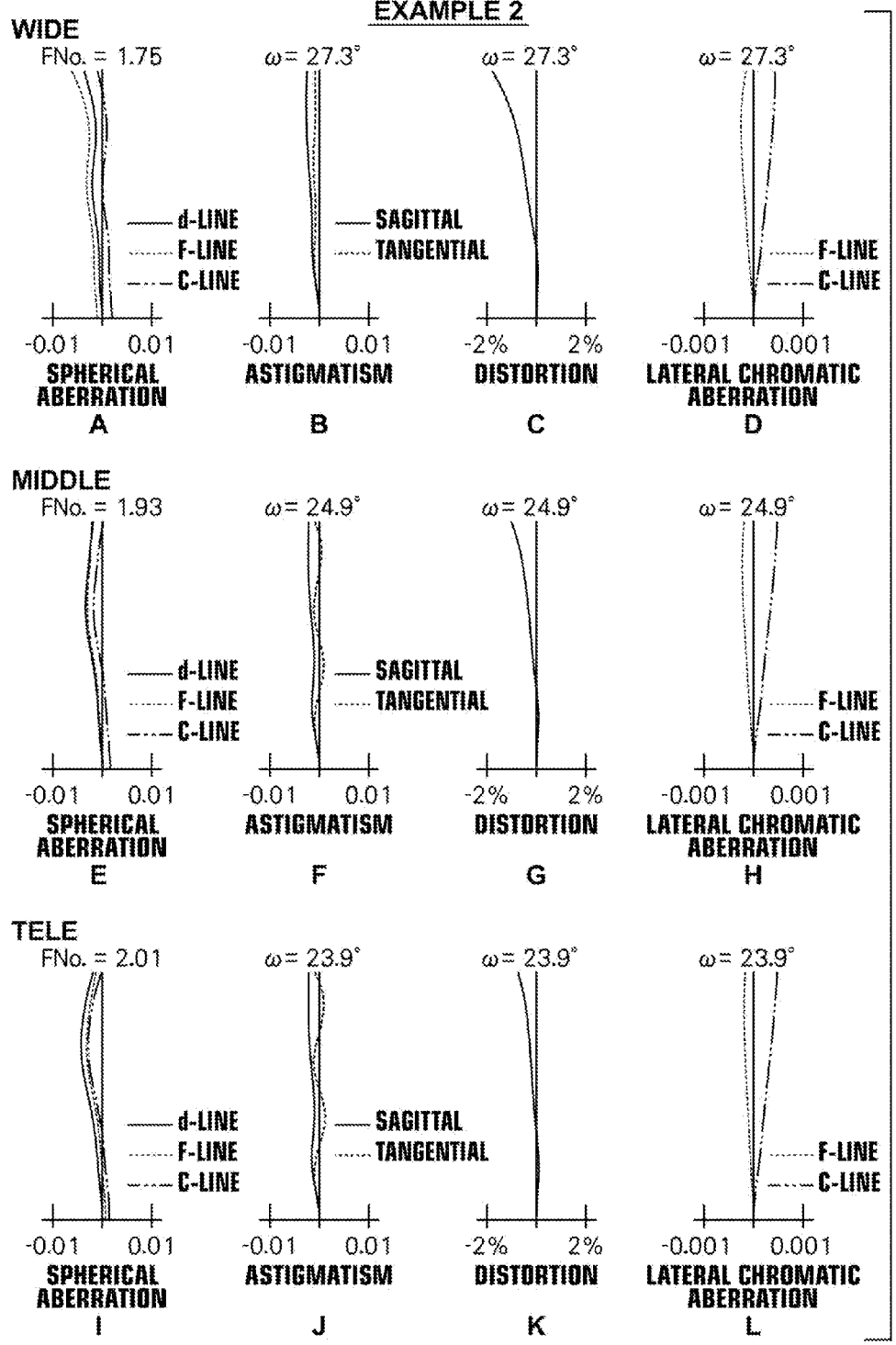

A to L of FIG. 7 illustrate each aberration diagram of the variable magnification projection optical system according to Example 2.

Figure 8:
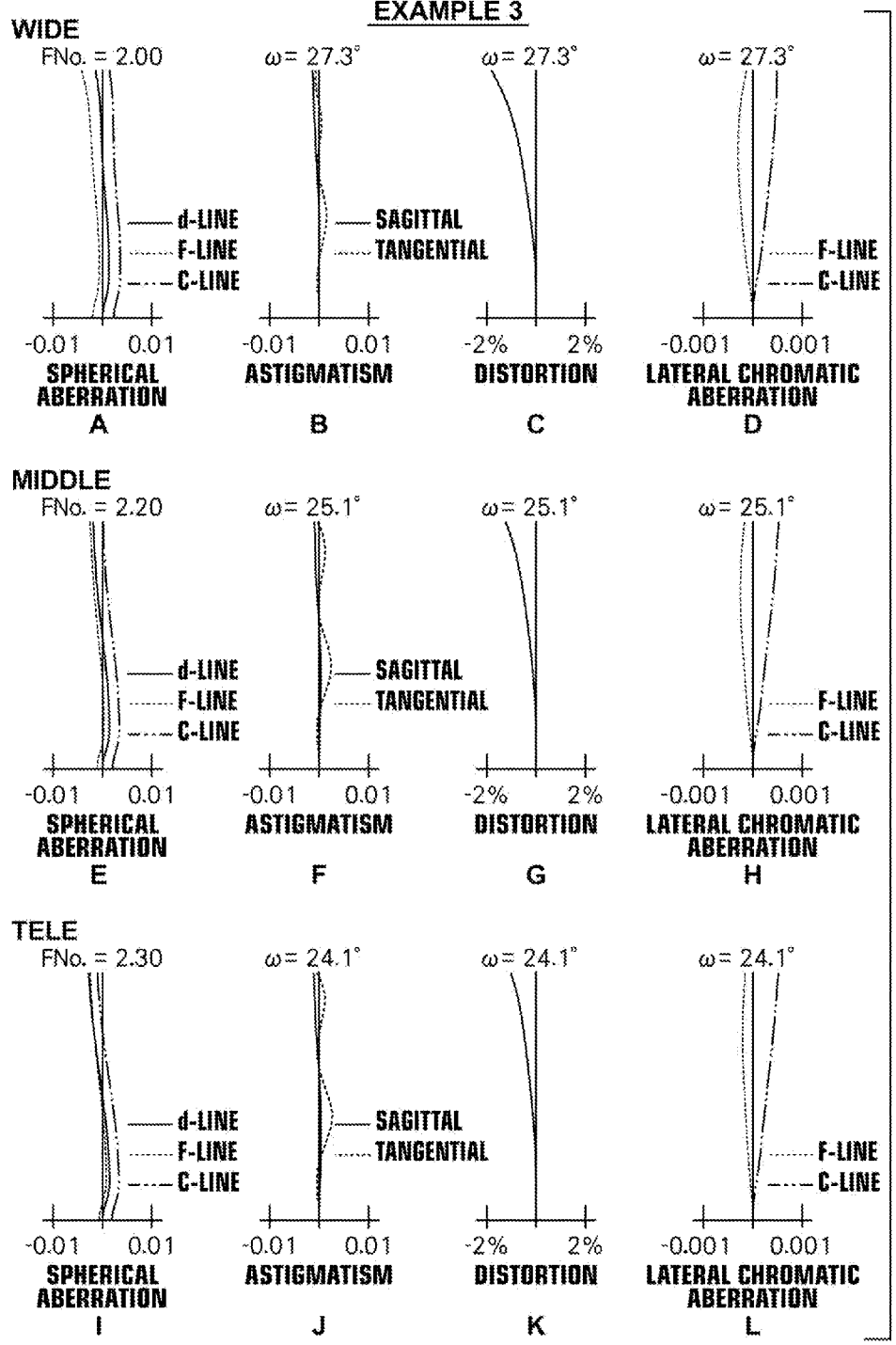

A to L of FIG. 8 illustrate each aberration diagram of the variable magnification projection optical system according to Example 3.

Figure 9:
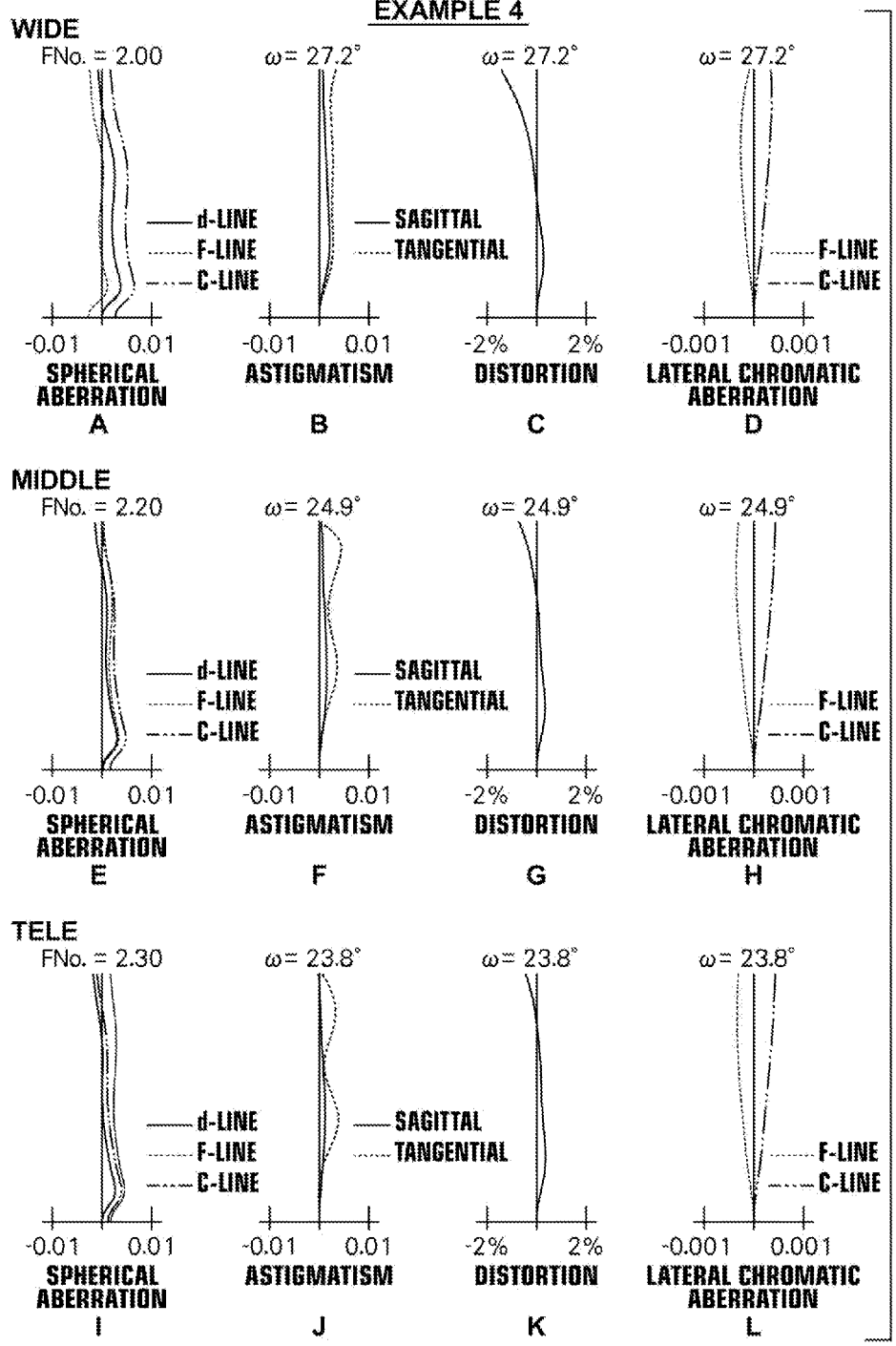

A to L of FIG. 9 illustrate each aberration diagram of the variable magnification projection optical system according to Example 4.

Figure 10:
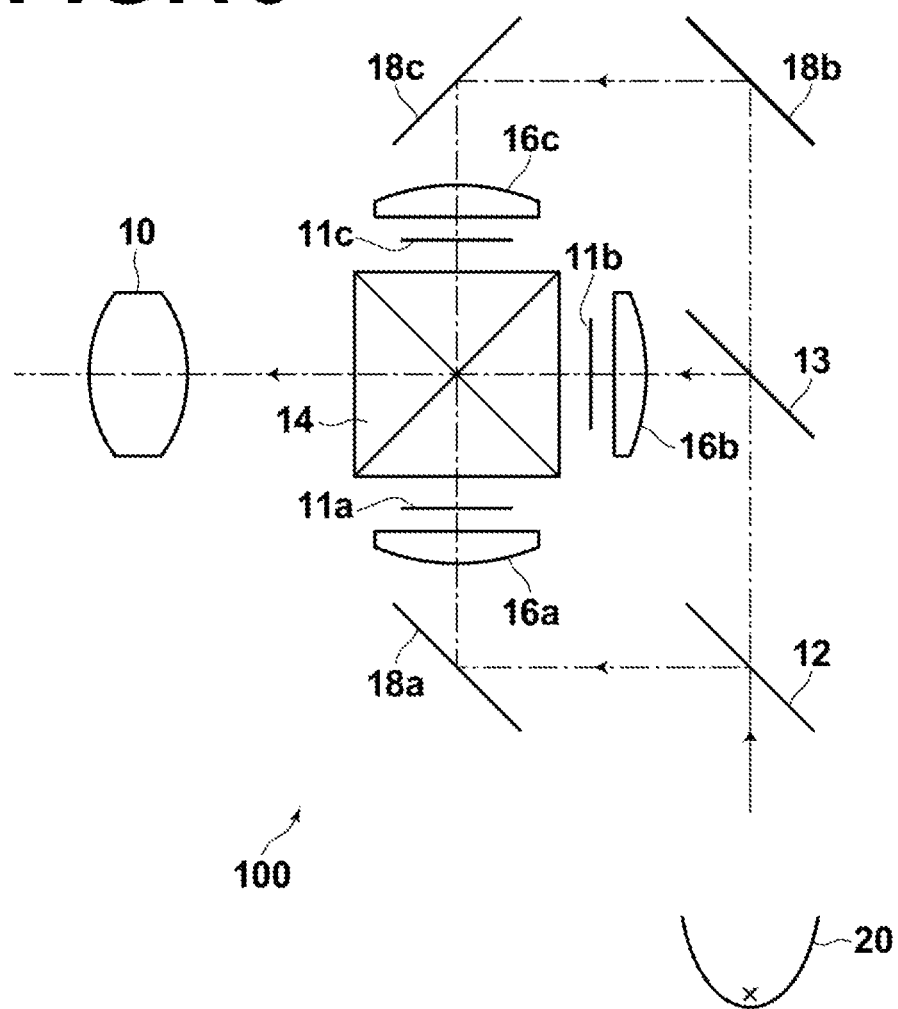

FIG. 10 is a schematic configuration diagram of a projection display apparatus according to one embodiment of the present invention.

BEST MODE FOR CARRYING OUT THE INVENTION

Figure 1:
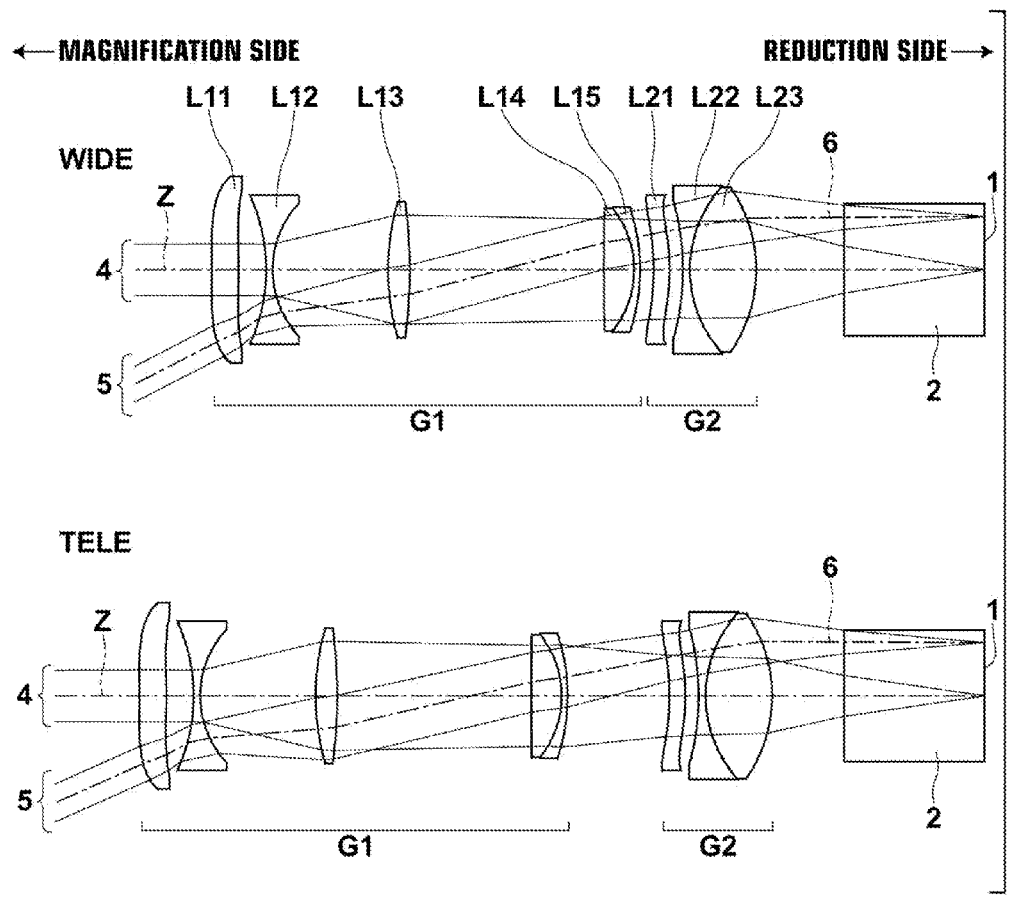
FIG. 1 is a cross-sectional view of a variable magnification projection optical system according to one embodiment of the present invention, illustrating the lens configuration thereof and ray trajectories.

Hereinafter, embodiments of the present invention will be described in detail with reference to the accompanying drawings. FIG. 1 is a cross-sectional view of a variable magnification projection optical system according to one embodiment of the present invention, illustrating an example configuration thereof. The example illustrated in FIG. 1 corresponds to a variable magnification projection optical system of Example 1, to be described later. Note that FIG. 1 also illustrates axial light beam 4 and off-axis light beam 5 at the maximum angle of view. In FIG. 1, the upper side diagram with a sign "WIDE" attached thereto illustrates the disposition and the configuration of each lens group at the wide angle end while the lower side diagram with a sign "TELE" attached thereto illustrates the disposition and the configuration of each lens group at the telephoto end.

The variable magnification projection optical system may be installed, for example, in a projection display apparatus and usable as a projection lens that projects image information displayed on a light valve onto a screen. In FIG. 1, the left side is the magnification side and the right side is the reduction side, and FIG. 1 also illustrates a glass block 2 which assumes a filter, a prism or the like used in a color combining section or an illumination light separation section, and an image display surface 1 of the light valve located on the reduction side surface of the glass block 2.

In the projection display apparatus, a light beam with image information given by the image display surface 1 is inputted to the variable magnification projection optical system via the glass block 2 and projected on a screen (not shown) disposed on the left side direction in the drawing by the variable magnification projection optical system.

FIG. 1 illustrates an example in which the position of the reduction side surface of the glass block 2 corresponds to the position of the image display surface 1, but not necessarily limited to this. Further, FIG. 1 shows only one image display surface 1, but the projection display apparatus may be structured to allow a full color image display by separating a light beam from the light source into three primary colors by a color separation optical system and disposing three light valves for each primary color.

The variable magnification projection optical system according to the present embodiment substantially consists of two lens groups of a first lens group G1 having a positive refractive power and a second lens group G2 having a positive refractive power disposed in order from the magnification side and is configured such that the reduction side is telecentric.

The term "reduction side is telecentric" as used in the present invention refers to, when a ray trace is performed from the magnification side to the reduction side, that the angle bisector line between the upper side maximum ray and the lower side maximum lay on the cross-section of a light beam focusing on any arbitrary point on the image display surface 1 on the reduction side is in the state of nearly parallel to the optical axis Z. That is, it is not limited to be completely telecentric, i.e., the case in which the angle bisector line is totally parallel to the optical axis Z and may include the case in which there is some errors (the bisector line has a small inclination with respect to the optical axis). Here, the term "case in which there is some errors (the bisector line has a small inclination with respect to the optical axis)" refers to a case in which the inclination with respect to the optical axis is within ±3° at both the wide angle end and the telephoto end. In the example illustrated in FIG. 1, the angle bisector line 6 with respect to the off-axis light beam 5 is illustrated by the dash-dot line within the off-axis light beam 5. Although the example in FIG. 1 illustrates a case in which no aperture stop is installed, the concept of the "reduction side is telecentric" described above is also applicable to the case in which an aperture stop or a light shielding member that intentionally shield a portion of a light beam is disposed.

In the present variable magnification projection optical system, the first lens group G1 and the second lens group G2 are moved in an optical axis direction during magnification change. For example, in the example illustrated in FIG. 1, the first lens group G1 is moved to the magnification side and the second lens group G2 is moved to the reduction side during magnification change from the wide angle end to the telephoto end.

In the present variable magnification projection optical system takes a two group configuration of two lens groups for simplicity of configuration, and both lens groups are positive lens groups. Such a two group configuration in which a positive lens group and a positive lens group are disposed in order from the magnification side is cannot provide a large magnification ratio, as the amount of change in the focal length is small when the distance between the two lens groups is changed but, instead, has an advantage that it secures a sufficient back focus to insert a color combining prism, a TIR prism, and the like without increasing the overall length of the lens system, which allows telecentricity to be achieved easily. Further, this configuration may minimize variations in aberrations during magnification change over the entire range of magnification change, so that it is possible to maintain a variable optical system in which aberrations are satisfactorily corrected over the entire range of magnification change. Because of the foregoing, the two group configuration of positive and positive refractive power arrangement from the magnification side as in the present variable magnification projection optical system is preferable in variable magnification projection optical systems that do not require a relatively high magnification ratio unlike the variable magnification optical systems for digital cameras and the like.

In the example illustrated in FIG. 1, the second lens group G2 is moved to the reduction side during magnification change from the wide angle end to the telephoto end and the back focus is reduced at the telephoto end, but by controlling the position of the principal point on the reduction side, a sufficient back focus to insert a color combining prism and the like is secured even under this state of the telephoto end and satisfactory telecentricity may be maintained over the entire range of magnification change. The arrangement of positive and positive lens groups in order from the magnification side in a two group configuration allows easy control of such principal point position on the reduction side. In particular, it is advantageous for securing telecentricity to give a positive refractive power to the second lens group G2.

In order to make it easier to secure a sufficient back focus and satisfactory telecentricity, the present variable magnification projection optical system preferably satisfies a conditional expression (1) given below, $$1.0 < Bft/fw \qquad (1)$$

where,

Bft: back focus of the entire system at the telephoto end
fw: focal length of the entire system at the wide angle end The conditional expression (1) divides the back focus at the telephoto end by the focal length at the wide angle end, and indicates the relationship between the back focus and the principal point position on the reduction side. If the variable magnification projection optical system falls to the lower limit of the conditional expression (1) or below, it is difficult to insert a color combining prism, a TIR prism, and the like between the variable magnification projection optical system and the light valve, and to secure satisfactory telecentricity. Satisfaction of the conditional expression (1) allows the system to secure not only a sufficient back focus to insert a color combining prism, a TIR prism, and the like, but also satisfactory telecentricity.

From the foregoing circumstances, it is more preferable that the system satisfies a conditional expression (1') given below, in order to make it easier to secure a sufficient back focus to insert various types of prisms and the like and satisfactory telecentricity.

$$1.2 < Bft/fw \quad (1')$$

Preferably, the variable magnification projection optical system of the present embodiment satisfies at least either of conditional expressions (2) and (3) given below.

$$1.5 < f1/fw < 3.5 \quad (2)$$

$$0.5 < f2/f1 < 1.5 \quad (3)$$

where,
 f1: focal length of the first lens group
 f2: focal length of the second lens group
 fw: focal length of the entire system at the wide angle end If the system falls to the lower limit of the conditional expression (2) or below, the positive power of the first lens group G1 is increased too much, and aberration correction is difficult with a small number of lenses. Otherwise, if the number of lenses is increased for satisfactory aberration correction, the entire lens system is increased. If the system reaches or exceeds the upper limit of the conditional expression (2), the positive power of the first lens group G1 is reduced too much and the amount of movement of the first lens group G1 is increased, whereby the entire lens system is increased. Satisfaction of the conditional expression (2) allows the system to perform satisfactory aberration correction while the entire lens system is prevented from increasing.

From the foregoing circumstances, it is more preferable that the system satisfies a conditional expression (2') given below, in order to further prevent the entire lens system from increasing, while performing more satisfactory aberration correction.

$$1.8 < f1/fw < 3.0 \quad (2')$$

The conditional expression (3) is a conditional expression for securing satisfactory telecentricity while securing a satisfactory optical performance and a predetermined magnification ratio and if the system falls outside the range, the correction of spherical aberration and astigmatism is difficult, and a predetermined magnification ratio and a sufficient back focus are difficult to secure.

From the foregoing circumstances, it is more preferable that the system satisfies a conditional expression (3') given below in order to secure a more satisfactory optical performance and more satisfactory telecentricity, while securing a predetermined magnification ratio.

$$0.8 < f2/f1 < 1.3 \quad (3')$$

As for the configuration of each lens group, the first lens group G1 is preferably composed of five lenses, and the second lens group G2 is preferably composed of three lenses or less. The preferable numbers of lenses in the first lens group G1 and the second lens group G2 are minimum numbers of lenses in a two group variable magnification projection optical system to realize reduction in size, weight, and cost, as well as satisfactory correction of aberrations. For example, in the example illustrated in FIG. 1, the first lens group G1 is composed of five lenses of lenses L11 to L15, while the second lens group G2 is composed of three lenses of lenses L21 to L23.

Preferably, the most magnification side lens (lens L11 in the example of FIG. 1) in the first lens group G1 is an aspherical lens. In that case, the aspherical lens is preferably formed of a plastic material. The disposition of an aspherical lens on the most magnification side in the first lens group G1 is effective to correct off-axis aberrations, in particular, distortion. The use of a plastic material is advantageous for manufacturability and cost.

Preferably, the second lens (lens L12 in the example of FIG. 1) and the third lens (lens L13 in the example of FIG. 1) from the magnification side in the first lens group are a negative lens and a positive lens respectively. This allows satisfactory correction of off-axis aberrations to be made easily, while securing a predetermined angle of view.

Preferably, the most magnification side lens (lens L21 in the example of FIG. 1) in the second lens group G2 is an aspherical lens. In that case, the aspherical lens is preferably formed of a plastic material. The disposition of an aspherical lens on the most magnification side in the second lens group G2 is effective to correct astigmatism and spherical aberration. The use of a plastic material is advantageous for manufacturability and cost.

Preferably, the first lens (lens L23 in the example of FIG. 1) and the second lens (lens L22 in the example of FIG. 1) from the reduction side in the second lens group G2 are a positive lens and a negative lens respectively. This allows the principal point position on the reduction side of the second lens group G2 to be moved close to the image display surface 1 corresponding to the reduction side image plane, thereby making it easy to secure aback focus while having an appropriate magnification ratio.

For example, the detailed description of the example illustrated in FIG. 1 is as follows. The first lens group G1 is composed of a lens L11 of an aspherical lens having a concave shape on the magnification side in the paraxial region, a lens L12 of a biconcave lens, the lens L13 of a biconvex lens, a lens L4 of a positive lens, and a lens L5 of a negative meniscus lens disposed in order from the magnification side, in which the lens L14 and the lens L15 are cemented.

The second lens group G2 of the example illustrated in FIG. 1 is composed of a lens L21 of an aspherical lens having a positive meniscus shape with a convex surface on the reduction side in the paraxial region, a lens L22 of a biconcave lens, and a lens L23 of a biconvex lens disposed in order from the magnification side, in which the lens L22 and the lens L23 are cemented. As described above, the variable magnification projection optical system according to the present embodiment can be configured with a small number of lenses of eight in the entire system through effective disposition of aspherical lenses and efficient use of cemented lenses.

But the configuration of each lens group of the variable magnification projection optical system of the present invention is not limited to that illustrated in FIG. 1. For example, a configuration in which the order of the lens L4 and the lens L5 is changed without being cemented is also possible, as shown in an example to be described later. Further, such a configuration is also possible that the second lens group G2 is composed of two lenses of an aspherical lens having a negative meniscus shape with a convex shape on the reduction side in the paraxial region and a biconvex lens disposed in order from the magnification side.

Further, FIG. 1 illustrates an example configuration of a zoom lens, but the variable magnification projection optical system may be a varifocal lens. In the case of the varifocal lens, the drive mechanism may further be simplified.

If the variable magnification projection optical system of the present invention is a zoom lens, the lens group to be moved during focusing when the projection distance is changed may be only the first lens group G1, only the second lens group G2, or both the first lens group G1 and the second lens group G2.

Preferably, the variable magnification projection optical system of the present invention is of a configuration in which no intermediate image is formed, as illustrated in FIG. 1. The configuration in which no intermediate image is formed may prevent the overall length of the lens system to be increased.

As for the variable magnification projection optical system intended by the present invention, it is preferable that the distortion is suppressed to about 2% or less over the entire range of magnification change.

Preferably, the preferable configurations described above are selectively employed as appropriate according to the requirements of the variable magnification projection optical system.

Next, a projection display apparatus according to the present invention will be described with reference to FIG. 10. FIG. 10 is a schematic configuration diagram of a projection display apparatus according to one embodiment of the present invention.

A projection display apparatus 100 illustrated in FIG. 10 includes a variable magnification projection optical system 10 according to an embodiment of the present invention, a light source 20, transmission display elements 11a to 11c, as the light valve corresponding to each color light, dichroic mirrors 12, 13 for color decomposition, a cross-dichroic prism 14 for color combination, condenser lenses 16a to 16c, and total reflection mirrors 18a to 18c for deflecting optical paths. Note that the variable magnification projection optical system 10 is depicted schematically in FIG. 10. An integrator is disposed between the light source 20 and the dichroic mirror 12, but it is omitted in FIG. 10.

White light from the light source 20 is decomposed into three colored beams (G light, B light, R light) by the dichroic mirrors 12, 13. The three colored beams pass through the condenser lenses 16a to 16c respectively and are incident on the transmission display elements 11a to 11c corresponding to the respective colored beams and optically modulated. The optically modulated colored beams are color combined by the cross-dichroic mirror 14 and the color combined beam is incident on the variable magnification projection optical system 10. The variable magnification projection optical system 10 projects an optical image formed by the light optically modulated by the transmission display elements 11a to 11c on a screen (not shown).

As for the transmission display elements 11a to 11c, for example, transmission liquid crystal display elements may be used. FIG. 10 illustrates an example in which a transmission display element is used as the light valve, but the light valve provided in the projection display apparatus of the present invention is not limited to this, and other light modulation means may be used, such as reflection liquid crystal display element, DMD, and the like.

Specific examples of the variable magnification projection optical system of the present invention will now be described.

Example 1

FIG. 1 illustrates the lens configuration of a variable magnification projection optical system of Example 1. In FIG. 1, the upper side diagram with a sign "WIDE" attached thereto illustrates the lens configuration of each lens group at the wide angle end while the lower side diagram with a sign "TELE" attached thereto illustrates the lens configuration of each lens group at the telephoto end.

Figure 2:
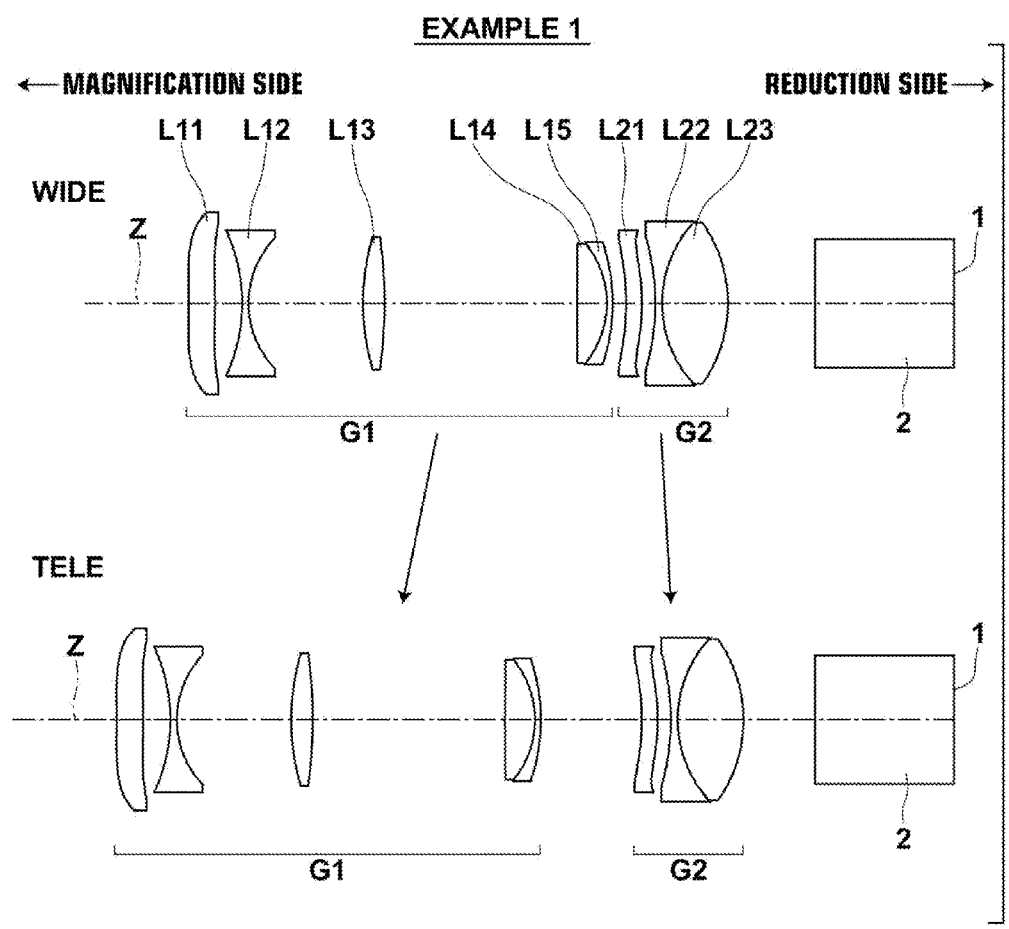
FIG. 2 is a cross-sectional view of a variable magnification projection optical system according to Example 1 of the present invention, illustrating the lens configuration thereof.

The variable magnification projection optical system of Example 1 is of a two group configuration in which a first lens group G1 having a positive refractive power and a second lens group G2 having a positive refractive power are disposed in order from the magnification side, and the reduction side is made telecentric. The first lens group G1 is moved to the magnification side and the second lens group G2 is moved to the reduction side during the magnification change from the wide angle end to the telephoto end. FIG. 2 schematically illustrates the movement directions of the two lens groups when changing from the wide angle end to the telephoto end by the arrows between each position. A glass block 2 which assumes various filters, a color combining prism, and the like is disposed on the reduction side of the second lens group G2, and an image display surface 1 of a light valve is disposed so as to contact the reduction side surface of the glass block 2. Note that the variable magnification projection optical system of Example 1 is configured such that the focusing when the projection distance is changed is performed by moving the second lens group G2.

The first lens group G1 is composed of a lens L11 having a positive meniscus shape with a convex surface on the reduction side in the paraxial region, a lens L12 of a biconcave lens, a lens L13 of a biconvex lens, a lens L14 of a biconvex lens, and a lens L15 of a negative meniscus lens with a convex surface on the reduction side disposed in order from the magnification side. The lens L14 and the lens L15 are cemented. Both surfaces of the lens L11 are aspherical surfaces.

The second lens group G2 is composed of a lens L21 having a positive meniscus shape with a convex surface on the reduction side in the paraxial region, a lens L22 of a biconcave lens, and a lens L23 of a biconvex lens disposed in order from the magnification side. The lens L22 and the lens L23 are cemented. Both surfaces of the lens L21 are aspherical surfaces.

Table 1 shows basic lens data of the variable magnification projection optical system of Example 1. The Si column in the basic lens data indicates $i^{th}$ surface number in which a number i (i=1, 2, 3, ... ) is given to each surface in a serially increasing manner toward the reduction side with the magnification side surface of the most magnification side component being taken as the first surface. The Ri column indicates the radius of curvature of $i^{th}$ surface and the Di column indicates the surface distance between $i^{th}$ surface and $(i+1)^{th}$ surface on the optical axis Z. The Ndj column indicates the refractive index of $j^{th}$ component with respect to the d-line (wavelength of 587.6 nm) in which a number j (j=1, 2, 3, ... ) is given to each component in a serially increasing manner toward the reduction side with the most magnification side component being taken as the first component, and the vdj column indicates the Abbe number of $j^{th}$ component with respect to the d-line.

Note that the sign of the radius of curvature is positive if the surface shape is convex on the magnification side and negative if it is convex on the reduction side. The basic lens data include the glass block 2. An asterisk mark * is attached to the surface number of an aspherical surface and a value of paraxial radius of curvature is shown in the row of the radius of curvature column corresponding to the aspherical surface. In Example 1, surfaces of the surface numbers 1, 2, 10, and 11 are aspherical surfaces.

The distance between the first lens group G1 and the second lens group G2, and the distance between the second lens group G2 and the glass block 2 are variable surface distances that change during magnification change. In each row of these variable surface distances in Di column, a symbol D with the magnification side surface number corresponding to the surface distance attached thereto is indicated. For example, in Example 1, D9 and D14 are indicated in the rows of these variable surface distances in the Di column.

Further, values of focal lengths of the entire system at the wide angle end, middle focal length state, and the telephoto end are indicated in brackets on the upper margin of Table 1.

Table 2 shows values of the aforementioned variable surface distances of the variable magnification projection optical system of Example 1 at the wide angle end, middle focal length state, and the telephoto end. The values shown in Table 2 are those when the projection distance is as shown in the upper margin of Table 2.

Table 3 shows aspherical surface coefficients of each aspherical surface. The "E-n" (n: integer) in the values of aspherical surface coefficients in Table 3 refers to "×10$^{-n}$". The aspherical surface coefficients are the values of coefficients K and Am (m=3, 4, 5, . . . , and 16) in an aspherical surface expression given below.

$$Zd = \frac{C \cdot Y^2}{1 + \sqrt{1 - K \cdot C^2 \cdot Y^2}} + \sum_{m=3}^{16} A_m Y^m$$

where:
Zd: depth of aspheric surface (length of vertical line from a point on the aspheric surface at height Y to a flat surface orthogonal to the optical axis to which the aspherical vertex contacts)
Y: height (distance from the optical axis to the lens surface);
C: paraxial curvature
K, Am: aspherical surface coefficients (m=3, 4, 5, . . . , and 16)

Note that the values in Tables 1 to 3 are those when normalized such that the focal length of the entire system at the wide angle end is 1. Further, the values in each table are those rounded to a predetermined digit.

TABLE 1

Example 1 Basic Lens Data (Focal Lengths = 1.00 to 1.10 to 1.15)

| Si | Ri | Di | Ndj | vdj |
|---|---|---|---|---|
| 1* | −13.079 | 0.254 | 1.4910 | 57.58 |
| 2* | −7.672 | 0.263 | | |
| 3 | −1.700 | 0.061 | 1.5317 | 48.84 |
| 4 | 0.930 | 1.100 | | |
| 5 | 2.338 | 0.206 | 1.7234 | 37.95 |
| 6 | −4.822 | 1.850 | | |
| 7 | 53.692 | 0.288 | 1.5891 | 61.14 |
| 8 | −0.934 | 0.056 | 1.8467 | 23.78 |
| 9 | −1.884 | D9 | | |
| 10* | −2.429 | 0.152 | 1.4910 | 57.58 |
| 11* | −1.969 | 0.127 | | |
| 12 | −2.415 | 0.066 | 1.5317 | 48.84 |
| 13 | 1.182 | 0.632 | 1.6230 | 58.16 |
| 14 | −1.381 | D14 | | |
| 15 | ∞ | 1.336 | 1.5163 | 64.14 |
| 16 | ∞ | | | |

TABLE 2

Example 1 Variable Surface Distance (Projection Distance = 93.944)

| | WIDE | MIDDLE | TELE |
|---|---|---|---|
| D9 | 0.129 | 0.716 | 0.970 |
| D14 | 0.218 | 0.117 | 0.067 |

TABLE 3

Example 1 Aspherical Surface Coefficient

| Surface Number = 1 | | | | |
|---|---|---|---|---|
| K | A3 | A4 | A5 | A6 |
| 5.30161E+01 | −4.79914E−02 | 6.45236E−01 | −1.07058E+00 | 2.09922E+00 |
| A7 | A8 | A9 | A10 | A11 |
| −2.50935E+00 | 8.87294E−01 | 1.51440E+00 | 2.11514E−02 | −7.31635E+00 |
| A12 | A13 | A14 | A15 | A16 |
| 1.20118E+01 | −5.27243E+00 | −4.77057E+00 | 5.77054E+00 | −1.48087E+00 |
| Surface Number = 2 | | | | |
| K | A3 | A4 | A5 | A6 |
| 9.17458E+01 | −5.09153E−02 | 3.81013E−01 | 9.19080E−01 | −2.18988E+00 |
| A7 | A8 | A9 | A10 | A11 |
| −1.48984E+01 | 8.30144E+01 | −1.59543E+02 | 9.02026E+01 | 1.44943E+02 |
| A12 | A13 | A14 | A15 | A16 |
| −3.05249E+02 | 2.58477E+02 | −1.47821E+02 | 7.50697E+01 | −2.29991E+01 |

TABLE 3-continued

| Surface Number = 10 | | | | |
|---|---|---|---|---|
| K | A3 | A4 | A5 | A6 |
| 1.00000E+00 | 0.00000E+00 | −2.83917E−02 | 3.64681E−03 | 2.87576E−02 |
| A7 | A8 | A9 | A10 | A11 |
| 6.57389E−01 | 1.13340E−01 | −1.17478E+00 | −1.34950E+00 | 1.39867E+00 |
| A12 | A13 | A14 | A15 | A16 |
| 5.39309E+00 | 4.36768E−01 | −9.19980E+00 | −3.16916E+00 | 9.72641E+00 |
| Surface Number = 11 | | | | |
| K | A3 | A4 | A5 | A6 |
| 1.00000E+00 | 0.00000E+00 | 1.52188E−01 | −1.23676E−01 | 4.75817E−01 |
| A7 | A8 | A9 | A10 | A11 |
| 1.91484E−01 | −2.81423E−01 | −3.17392E−01 | 3.14209E−01 | 1.02496E+00 |
| A12 | A13 | A14 | A15 | A16 |
| 1.08260E+00 | −1.52398E+00 | −4.52844E+00 | 1.59147E+00 | 6.33833E+00 |

A to D of FIG. 6 respectively show aberration diagrams of spherical aberration, astigmatism, distortion, lateral chromatic aberration of the variable magnification projection optical system of Example 1 at the wide angle end. E to H of FIG. 6 respectively show aberration diagrams of spherical aberration, astigmatism, distortion, lateral chromatic aberration of the variable magnification projection optical system of Example 1 in the middle focal length state. I to L of FIG. 6 respectively show aberration diagrams of spherical aberration, astigmatism, distortion, lateral chromatic aberration of the variable magnification projection optical system of Example 1 at the telephoto end.

Each of the aberration diagrams of A to L of FIG. 6 is based on the d-line, the spherical aberration diagrams also illustrate aberrations with respect to the F-line (wavelength of 486.1 nm) and the C-line (wavelength of 656.3 nm), and the lateral chromatic aberration diagrams illustrate aberrations with respect to the F-line and C-line. In each of the astigmatism diagrams, the solid line illustrates astigmatism in the sagittal direction while the dotted line illustrates astigmatism in the tangential direction. The "FNo." on the upper side of the vertical axis in each of the spherical aberration diagrams represents the F-number and the "ω" on the upper side of the vertical axis in each of the other aberration diagrams represents the half angle of view. These aberration diagrams are those when the projection distance is as shown in the note attached to the variable surface distance table.

The symbols, their meanings, illustration methods used in the various data, the fact that the data are normalized such that the focal length of the entire system at the wide angle end is 1, and that each aberration diagram is the diagram when the projection distance is as shown in the note attached to the variable surface distance table described in Example 1 will apply to the following Examples 2 to 4 unless otherwise specifically described.

Example 2

Figure 3:
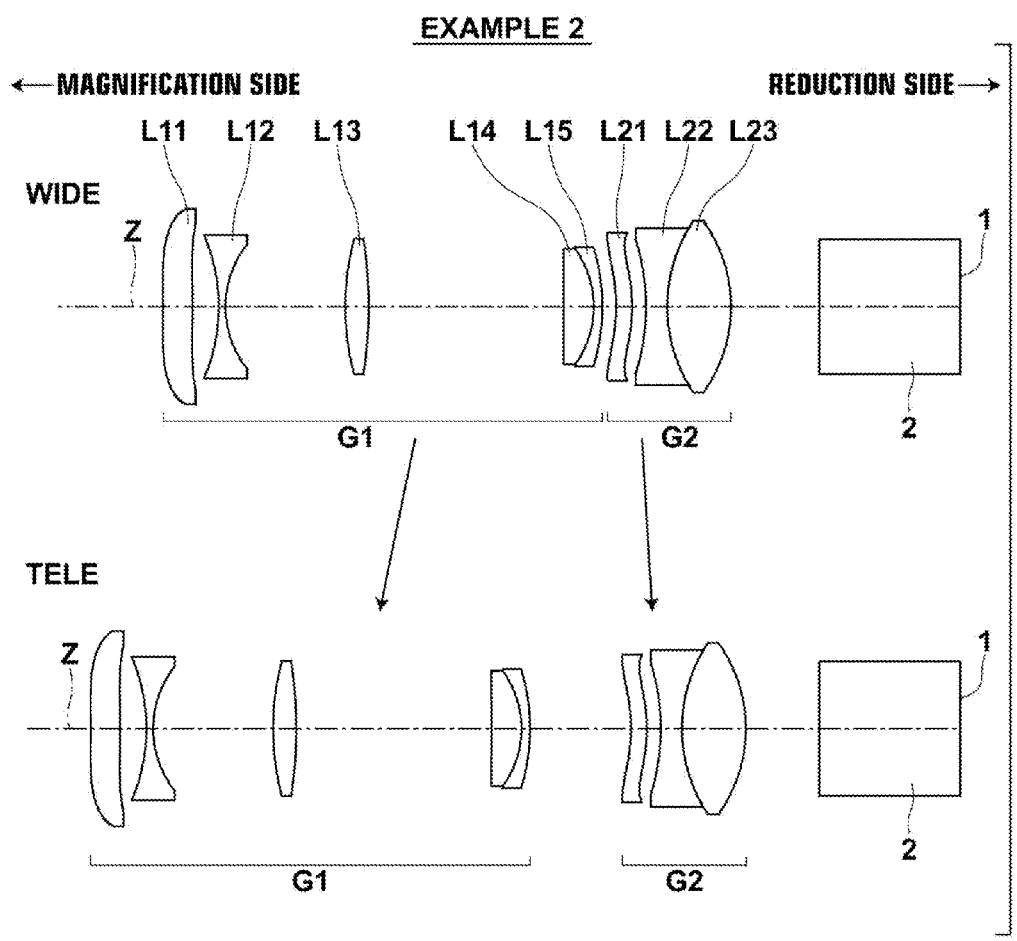
FIG. 3 is a cross-sectional view of a variable magnification projection optical system according to Example 2 of the present invention, illustrating the lens configuration thereof.

FIG. 3 illustrates the lens configuration of a variable magnification projection optical system of Example 2. The variable magnification projection optical system of Example 2 has an almost identical configuration to that of Example 1, but differs in that the lens L14 is a positive meniscus lens with a convex shape on the reduction side. Note that the variable magnification projection optical system of Example 2 is configured such that the focusing when the projection distance is changed is performed by moving the first lens group G1.

Tables 4, 5, and 6 respectively show basic lens data, variable surface distances, and aspherical surface coefficients of the variable magnification projection optical system of Example 2. A to L of FIG. 7 show each aberration diagram of the variable magnification projection optical system of Example 2.

TABLE 4

Example 2 Basic Lens Data (Focal Lengths = 1.00 to 1.10 to 1.15)

| Si | Ri | Di | Ndj | νdj |
|---|---|---|---|---|
| 1* | −11.562 | 0.279 | 1.4910 | 57.58 |
| 2* | −6.916 | 0.250 | | |
| 3 | −1.773 | 0.063 | 1.5317 | 48.84 |
| 4 | 0.980 | 1.134 | | |
| 5 | 2.519 | 0.222 | 1.7234 | 37.95 |
| 6 | −4.414 | 1.848 | | |
| 7 | −353.146 | 0.284 | 1.6031 | 60.64 |
| 8 | −0.963 | 0.081 | 1.8467 | 23.78 |
| 9 | −1.982 | D9 | | |
| 10* | −1.714 | 0.152 | 1.4910 | 57.58 |
| 11* | −1.468 | 0.131 | | |
| 12 | −2.178 | 0.201 | 1.5673 | 42.82 |
| 13 | 1.505 | 0.604 | 1.6968 | 55.53 |
| 14 | −1.435 | D14 | | |
| 15 | ∞ | 1.334 | 1.5163 | 64.14 |
| 16 | ∞ | | | |

TABLE 5

Example 2 Variable Surface Distance (Projection Distance = 93.868)

| | WIDE | MIDDLE | TELE |
|---|---|---|---|
| D9 | 0.130 | 0.705 | 0.955 |
| D14 | 0.217 | 0.123 | 0.076 |

TABLE 6

Example 2 Aspherical Surface Coefficient

Surface Number = 1

| K | A3 | A4 | A5 | A6 |
|---|---|---|---|---|
| 1.12402E+02 | 1.88927E-02 | 5.69320E-01 | -2.09058E+00 | 6.46864E+00 |

| A7 | A8 | A9 | A10 | A11 |
|---|---|---|---|---|
| -1.12223E+01 | 1.12813E+01 | -6.41505E+00 | 9.70374E+00 | -4.78172E+01 |

| A12 | A13 | A14 | A15 | A16 |
|---|---|---|---|---|
| 1.19694E+02 | -1.62133E+02 | 1.28954E+02 | -5.98020E+01 | 1.32244E+01 |

Surface Number = 2

| K | A3 | A4 | A5 | A6 |
|---|---|---|---|---|
| 6.96906E+01 | 2.76414E-02 | 2.99983E-01 | 3.88689E-01 | -6.01231E+00 |

| A7 | A8 | A9 | A10 | A11 |
|---|---|---|---|---|
| 2.24306E+01 | -3.70535E+01 | 4.39392E+01 | -1.04852E+02 | 1.99845E+02 |

| A12 | A13 | A14 | A15 | A16 |
|---|---|---|---|---|
| -1.23162E+02 | -8.46265E+01 | 9.84647E+01 | 2.47129E+01 | -3.41456E+01 |

Surface Number = 10

| K | A3 | A4 | A5 | A6 |
|---|---|---|---|---|
| 1.04263E+00 | 0.00000E+00 | 9.27842E-02 | -5.75406E-01 | 2.52726E+00 |

| A7 | A8 | A9 | A10 | A11 |
|---|---|---|---|---|
| 4.88381E+00 | -3.49419E+01 | 4.40189E+01 | 2.10206E+01 | 1.23745E+01 |

| A12 | A13 | A14 | A15 | A16 |
|---|---|---|---|---|
| -2.09532E+02 | 6.93309E+01 | 4.08009E+02 | -4.48698E+02 | 1.30586E+02 |

Surface Number = 11

| K | A3 | A4 | A5 | A6 |
|---|---|---|---|---|
| 1.62814E+00 | 0.00000E+00 | 2.26427E-01 | 2.04260E-01 | -7.46872E-01 |

| A7 | A8 | A9 | A10 | A11 |
|---|---|---|---|---|
| 6.63793E+00 | -1.53950E+01 | 1.37807E+01 | 1.43915E+01 | -1.34207E+02 |

| A12 | A13 | A14 | A15 | A16 |
|---|---|---|---|---|
| 3.81305E+02 | -2.99590E+02 | -4.70429E+02 | 9.19223E+02 | -4.16333E+02 |

Example 3

Figure 4:
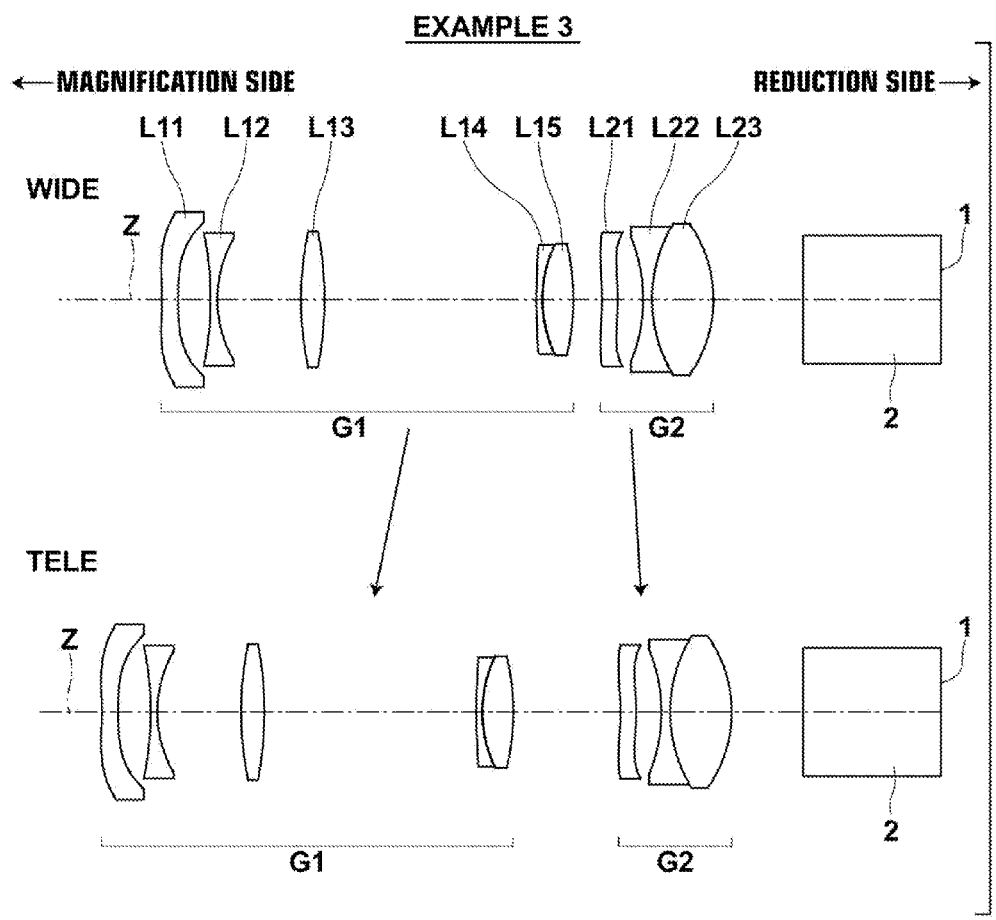
FIG. 4 is a cross-sectional view of a variable magnification projection optical system according to Example 3 of the present invention, illustrating the lens configuration thereof.

FIG. 4 illustrates the lens configuration of a variable magnification projection optical system of Example 3. The variable magnification projection optical system of Example 3 has an almost identical configuration to that of Example 1, but differs in that the lens L11 has a biconcave shape in the paraxial region, the lens L14 is a negative meniscus lens with a convex surface on the magnification side, the lens L15 is a biconvex lens, and the lens L14 and the lens L15 are not cemented. Note that the variable magnification projection optical system of Example 3 is configured such that the focusing when the projection distance is changed is performed by moving the second lens group G2.

Tables 7, 8, and 9 respectively show basic lens data, variable surface distances, and aspherical surface coefficients of the variable magnification projection optical system of Example 3. A to L of FIG. 8 show each aberration diagram of the variable magnification projection optical system of Example 3.

TABLE 7

Example 3 Basic Lens Data (Focal Lengths = 1.00 to 1.10 to 1.15)

| Si | Ri | Di | Ndj | νdj |
|---|---|---|---|---|
| 1* | -3.199 | 0.159 | 1.4910 | 57.58 |
| 2* | 8.146 | 0.315 | | |
| 3 | -3.300 | 0.063 | 1.5163 | 64.14 |
| 4 | 1.220 | 0.810 | | |
| 5 | 3.251 | 0.228 | 1.7234 | 37.95 |
| 6 | -3.541 | 2.049 | | |
| 7 | 6.691 | 0.056 | 1.7552 | 27.51 |
| 8 | 1.273 | 0.006 | | |
| 9 | 1.287 | 0.297 | 1.6204 | 60.29 |

TABLE 7-continued

Example 3 Basic Lens Data (Focal Lengths = 1.00 to 1.10 to 1.15)

| Si | Ri | Di | Ndj | vdj |
|---|---|---|---|---|
| 10 | −2.393 | D10 | | |
| 11* | −2.974 | 0.152 | 1.4910 | 57.58 |
| 12* | −2.651 | 0.245 | | |
| 13 | −1.649 | 0.086 | 1.5673 | 42.82 |
| 14 | 1.455 | 0.595 | 1.7130 | 53.87 |
| 15 | −1.322 | D15 | | |
| 16 | ∞ | 1.336 | 1.5163 | 64.14 |
| 17 | ∞ | | | |

TABLE 8

Example 3 Variable Surface Distance (Projection Distance = 93.966)

| | WIDE | MIDDLE | TELE |
|---|---|---|---|
| D10 | 0.277 | 0.806 | 1.035 |
| D15 | 0.247 | 0.129 | 0.070 |

TABLE 9

Example 3 Aspherical Surface Coefficient

Surface Number = 1

| K | A3 | A4 | A5 | A6 |
|---|---|---|---|---|
| 1.01885E+01 | 2.48683E−02 | 1.30403E+00 | −1.76482E+00 | 1.96229E+00 |

| A7 | A8 | A9 | A10 | A11 |
|---|---|---|---|---|
| −2.31080E+00 | 1.02141E+00 | 1.53877E+00 | 1.53443E−02 | −7.30822E+00 |

| A12 | A13 | A14 | A15 | A16 |
|---|---|---|---|---|
| 1.19349E+01 | −5.34318E+00 | −4.67198E+00 | 5.72175E+00 | −1.61760E+00 |

Surface Number = 2

| K | A3 | A4 | A5 | A6 |
|---|---|---|---|---|
| 9.00000E+01 | 5.88295E−02 | 7.92886E−01 | 9.58048E−01 | −2.68251E+00 |

| A7 | A8 | A9 | A10 | A11 |
|---|---|---|---|---|
| −1.54192E+01 | 8.31045E+01 | −1.57922E+02 | 9.12412E+01 | 1.41964E+02 |

| A12 | A13 | A14 | A15 | A16 |
|---|---|---|---|---|
| −3.04620E+02 | 2.57845E+02 | −1.46943E+02 | 7.51502E+01 | −2.35592E+01 |

Surface Number = 11

| K | A3 | A4 | A5 | A6 |
|---|---|---|---|---|
| 1.00000E+00 | 0.00000E+00 | 3.46835E−01 | 2.15453E−01 | −2.32842E−02 |

| A7 | A8 | A9 | A10 | A11 |
|---|---|---|---|---|
| 8.16848E−02 | −1.43548E−01 | −5.43552E−01 | −9.23776E−01 | −7.18840E−01 |

| A12 | A13 | A14 | A15 | A16 |
|---|---|---|---|---|
| 1.30299E+00 | 8.96293E+00 | −1.15975E+01 | −7.32479E+00 | 1.43893E+01 |

Surface Number = 12

| K | A3 | A4 | A5 | A6 |
|---|---|---|---|---|
| 1.00000E+00 | 0.00000E+00 | 5.21342E−01 | 1.80259E−01 | 8.59877E−02 |

| A7 | A8 | A9 | A10 | A11 |
|---|---|---|---|---|
| 3.97382E−01 | 2.16666E−01 | −9.19250E−01 | −1.86954E+00 | −6.10161E−01 |

| A12 | A13 | A14 | A15 | A16 |
|---|---|---|---|---|
| 4.19663E+00 | 6.20941E+00 | −1.58444E+01 | 8.51614E+00 | 1.89210E+00 |

Example 4

Figure 5:
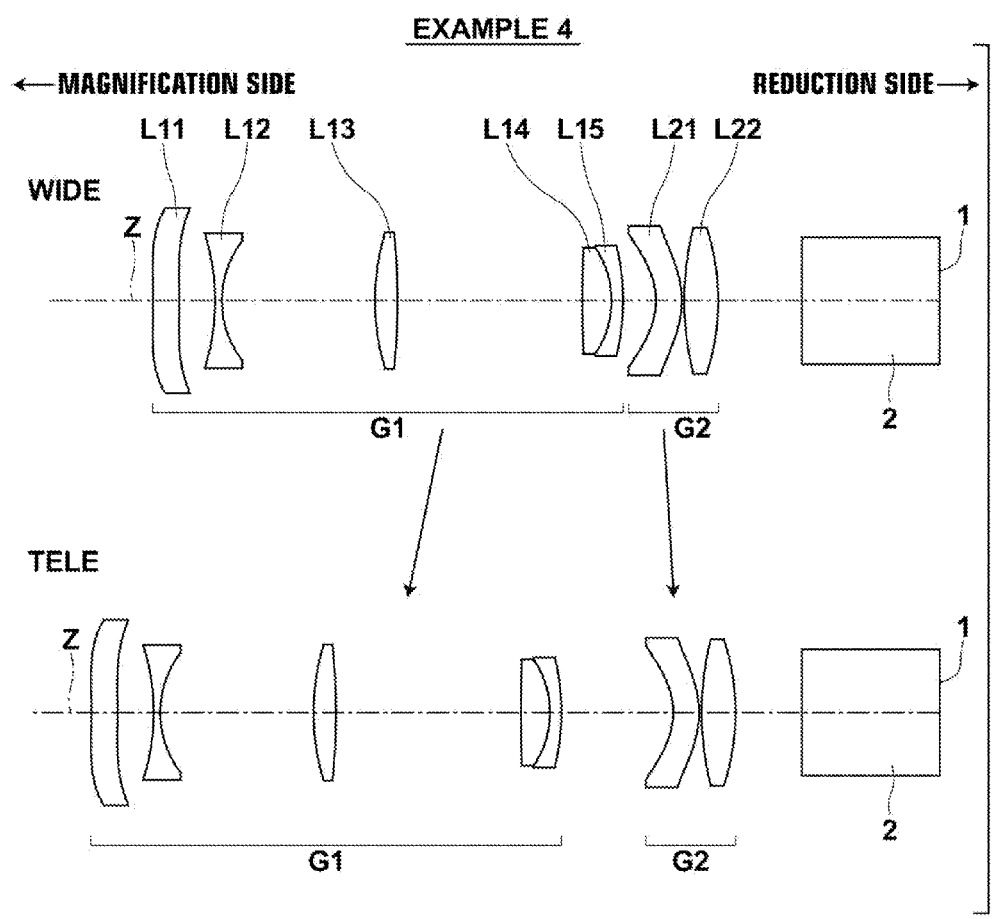
FIG. 5 is a cross-sectional view of a variable magnification projection optical system according to Example 4 of the present invention, illustrating the lens configuration thereof.

FIG. 5 illustrates the lens configuration of a variable magnification projection optical system of Example 4. The variable magnification projection optical system of Example 4 has an almost identical configuration to that of Example 1, but differs in that the second lens group G2 is of a two lens configuration in which lenses L21 to L22 are disposed in order from the magnification side, the lens L11 has a negative meniscus shape with a convex surface on the reduction side in the paraxial region, the lens L21 has a negative meniscus shape with a convex surface on the reduction side in the paraxial region, and the lens L22 is a biconvex lens. Note that the variable magnification projection optical system of Example 4 is configured such that the focusing when the projection distance is changed is performed by moving the first lens group G1.

Tables 10, 11, and 12 respectively show basic lens data, variable surface distances, and aspherical surface coefficients of the variable magnification projection optical system of Example 4. A to L of FIG. 9 show each aberration diagram of the variable magnification projection optical system of Example 4.

TABLE 10

Example 4 Basic Lens Data (Focal Lengths = 1.00 to 1.10 to 1.15)

| Si | Ri | Di | Ndj | vdj |
|---|---|---|---|---|
| 1* | −7.886 | 0.254 | 1.4910 | 57.58 |
| 2* | −11.973 | 0.351 | | |
| 3 | −2.199 | 0.063 | 1.4875 | 70.23 |
| 4 | 0.982 | 1.485 | | |
| 5 | 2.370 | 0.217 | 1.7432 | 49.34 |
| 6 | −6.335 | 1.790 | | |
| 7 | 12.900 | 0.283 | 1.6031 | 60.64 |
| 8 | −0.945 | 0.110 | 1.8467 | 23.78 |
| 9 | −2.373 | D9 | | |
| 10* | −0.715 | 0.249 | 1.4910 | 57.58 |
| 11* | −0.982 | 0.025 | | |
| 12 | 2.996 | 0.329 | 1.6204 | 60.29 |
| 13 | −2.367 | D13 | | |
| 14 | ∞ | 1.333 | 1.5163 | 64.14 |
| 15 | ∞ | | | |

TABLE 11

Example 4 Variable Surface Distance (Projection Distance = 93.790)

| | WIDE | MIDDLE | TELE |
|---|---|---|---|
| D9 | 0.319 | 0.852 | 1.083 |
| D13 | 0.194 | 0.082 | 0.025 |

TABLE 12

Example 4 Aspherical Surface Coefficient

Surface Number = 1

| K | A3 | A4 | A5 | A6 |
|---|---|---|---|---|
| 6.24925E+01 | −9.46053E−02 | 1.13206E+00 | −2.70634E+00 | 4.89244E+00 |

| A7 | A8 | A9 | A10 | A11 |
|---|---|---|---|---|
| −6.30854E+00 | 7.58144E+00 | −8.86194E+00 | 5.77195E+00 | 2.63110E+00 |

| A12 | A13 | A14 | A15 | A16 |
|---|---|---|---|---|
| −7.81862E+00 | 2.24710E+00 | 8.31555E+00 | −1.00432E+01 | 3.57015E+00 |

Surface Number = 2

| K | A3 | A4 | A5 | A6 |
|---|---|---|---|---|
| −2.08563E+03 | −1.04884E−01 | 7.46472E−01 | 1.53528E−01 | −7.52576E+00 |

| A7 | A8 | A9 | A10 | A11 |
|---|---|---|---|---|
| 2.10342E+01 | −1.61955E+01 | −1.79718E+01 | 3.22036E+01 | −2.30306E+01 |

| A12 | A13 | A14 | A15 | A16 |
|---|---|---|---|---|
| 6.39471E+01 | −1.00117E+02 | 3.32538E+01 | 3.53683E+01 | −2.16887E+01 |

Surface Number = 10

| K | A3 | A4 | A5 | A6 |
|---|---|---|---|---|
| 9.85170E−01 | −5.10584E−02 | 7.83006E−01 | −1.34809E+00 | 5.81564E+00 |

| A7 | A8 | A9 | A10 | A11 |
|---|---|---|---|---|
| −1.81151E+01 | 1.63214E+01 | 1.22308E+02 | −3.85029E+02 | 3.93070E+02 |

TABLE 12-continued

| A12 | A13 | A14 | A15 | A16 |
|---|---|---|---|---|
| −3.52001E+02 | 7.60699E+02 | −7.48460E+01 | −1.74187E+03 | 1.39417E+03 |

| Surface Number = 11 | | | | |
|---|---|---|---|---|
| K | A3 | A4 | A5 | A6 |
| 1.01067E+00 | 3.89983E−03 | −1.90925E−01 | 6.35155E+00 | −4.64358E+01 |
| A7 | A8 | A9 | A10 | A11 |
| 2.16948E+02 | −6.14280E+02 | 8.17104E+02 | 5.34359E+02 | −3.60127E+03 |
| A12 | A13 | A14 | A15 | A16 |
| 4.33777E+03 | 5.44420E+02 | −5.68196E+03 | 4.79899E+03 | −1.30485E+03 |

Table 13 shows values of various kinds and values corresponding the conditional expressions (1) to (3). Note that the Bfw in Table 13 is the back focus of the entire system at the wide angle end (air equivalent distance). All Examples 1 to 4 satisfy the conditional expressions (1) to (3).

TABLE 13

| | | Example 1 | Example 2 | Example 3 | Example 4 |
|---|---|---|---|---|---|
| | fw | 1.00 | 1.00 | 1.00 | 1.00 |
| | ft | 1.15 | 1.15 | 1.15 | 1.15 |
| | f1 | 2.50 | 2.57 | 2.20 | 2.26 |
| | f2 | 2.60 | 2.43 | 2.67 | 2.57 |
| | Bfw | 1.71 | 1.71 | 1.74 | 1.68 |
| | Bft | 1.55 | 1.56 | 1.56 | 1.51 |
| Conditional Expression (1) | Bft/fw | 1.55 | 1.56 | 1.56 | 1.51 |
| Conditional Expression (2) | f1/fw | 2.50 | 2.57 | 2.20 | 2.26 |
| Conditional Expression (3) | f2/f1 | 1.04 | 0.95 | 1.21 | 1.14 |

So far the present invention has been described by way of embodiments and Examples, but it should be understood that the variable magnification projection optical system of the present invention is not limited to the examples described above, and various changes and modifications may be made. For example, the radius of curvature, surface distance, refractive index, Abbe number, and aspherical surface coefficients of each lens may be changed as appropriate.

Further, the projection display apparatus of the present invention is not limited to those having aforementioned configurations and, for example, the light valve and optical members used for separating or combining light beams are not limited to those having the structures described above, and various changes and modifications may be made to the embodiments.

What is claimed is:

1. A variable magnification projection optical system, substantially consisting of two lens groups of a first lens group having a positive refractive power and a second lens group having a positive refractive power, disposed in order from the magnification side, wherein:
the first lens group is moved to the magnification side and the second lens group is moved to the reduction side during magnification change from the wide angle end to the telephoto end; and
the variable magnification projection optical system is configured such that the reduction side is telecentric.

2. The variable magnification projection optical system as claimed in claim 1, wherein the variable magnification projection optical system satisfies a conditional expression (1) given below:

$$1.0 < Bft/fw \quad (1),$$

where,
Bft: back focus of the entire system at the telephoto end (air equivalent distance)
fw: focal length of the entire system at the wide angle end.

3. The variable magnification projection optical system as claimed in claim 2, wherein the variable magnification projection optical system satisfies a conditional expression (1') given below:

$$1.2 < Bft/fw \quad (1').$$

4. The variable magnification projection optical system as claimed in claim 1, wherein the variable magnification projection optical system satisfies a conditional expression (2) given below:

$$1.5 < f1/fw < 3.5 \quad (2)$$

where,
f1: focal length of the first lens group
fw: focal length of the entire system at the wide angle end.

5. The variable magnification projection optical system as claimed in claim 4, wherein the variable magnification projection optical system satisfies a conditional expression (2') given below:

$$1.8 < f1/fw < 3.0 \quad (2').$$

6. The variable magnification projection optical system as claimed in claim 1, wherein the variable magnification projection optical system satisfies a conditional expression (3) given below:

$$0.5 < f2/f1.5 \quad (3)$$

where,
f1: focal length of the first lens group
f2: focal length of the second lens group.

7. The variable magnification projection optical system as claimed in claim 6, wherein the system satisfies a conditional expression (3') given below:

$$0.8 < f2/f1 < 1.3 \quad (3').$$

8. The variable magnification projection optical system as claimed in claim 1, wherein the first lens group is substantially composed of five lenses.

9. The variable magnification projection optical system as claimed in claim 1, wherein the second and third lenses from the magnification side in the first lens group are a negative lens and a positive lens respectively.

10. The variable magnification projection optical system as claimed in claim 1, wherein the second lens group is substantially composed of three lenses or less.

11. The variable magnification projection optical system as claimed in claim 1, wherein the first and second lenses from the reduction side in the second lens group are a positive lens and a negative lens respectively.

12. The variable magnification projection optical system as claimed in claim 1, wherein the most magnification side lens in the first lens group is an aspherical lens.

13. The variable magnification projection optical system as claimed in claim 12, wherein the aspherical lens in the first lens group is formed of a plastic material.

14. The variable magnification projection optical system as claimed in claim 1, wherein the most magnification side lens in the second lens group is an aspherical lens.

15. The variable magnification projection optical system as claimed in claim 14, wherein the aspherical lens in the second lens group is formed of a plastic material.

16. A projection display apparatus, comprising a light source, a light valve that receives light from the light source, and the variable magnification projection optical system as claimed in claim 1, as a variable magnification projection optical system for projecting an optical image formed by the light optically modulated by the light valve onto a screen.

\* \* \* \* \*